United States Patent
Mahapatro

(10) Patent No.: US 6,571,215 B1
(45) Date of Patent: May 27, 2003

(54) SYSTEM AND METHOD FOR GENERATING A SCHEDULE BASED ON RESOURCE ASSIGNMENTS

(75) Inventor: Neelamadhaba Mahapatro, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/786,489

(22) Filed: Jan. 21, 1997

(51) Int. Cl.[7] .............................................. G06F 17/60
(52) U.S. Cl. ............................ 705/8; 706/13; 707/10; 717/101
(58) Field of Search ..................... 705/9, 8, 7; 717/1, 717/101; 707/10; 706/13

(56) References Cited

U.S. PATENT DOCUMENTS

| | | | | |
|---|---|---|---|---|
| 5,255,181 A | * | 10/1993 | Chapman et al. | 705/8 |
| 5,291,394 A | * | 3/1994 | Chapman | 705/8 |
| 5,406,476 A | * | 4/1995 | Deziel, Jr. et al. | 705/8 |
| 5,630,070 A | * | 5/1997 | Dietrich et al. | 705/8 |
| 5,787,283 A | * | 7/1998 | Chin et al. | 717/101 |
| 5,878,416 A | * | 3/1999 | Harris et al. | 707/10 |
| 5,884,276 A | * | 3/1999 | Zhu et al. | 705/8 |
| 5,893,074 A | * | 4/1999 | Hughes et al. | 705/8 |
| 5,897,629 A | * | 4/1999 | Shinagawa et al. | 706/13 |

FOREIGN PATENT DOCUMENTS

GB        0669586 A2 A3  *  8/1995   ........... G06F/17/60

OTHER PUBLICATIONS

Heck, Mike, "High–end project managers," InfoWorld, vol. 15, N. 5, pp. 59–70, Feb. 1, 1993.*

Woodworth, Bruce, "A statistical evaluation of the impact of limited resources on project scheduling," Cost Engineering, vol. 35, N. 2, pp. 25–32, Feb. 1993.*

McDonald, Donald, "Software Review—Texim V1.1," Cost Engineering, vol. 34, N. 4, pp. 25–26, Apr. 1992.*

Heck, Mike, "New tools for an old need," InfoWorld, vol. 16, N. 40, pp. 68–83, Oct. 3, 1994.*

Martin, Daniel, "Cost/Schedule systems for a utility engineering organization," Cost Engineering, vol. 36, N. 5, pp. 29–34, Jun. 1994.*

* cited by examiner

Primary Examiner—Tariq R. Hafiz
Assistant Examiner—M. Irshadullah
(74) Attorney, Agent, or Firm—King & Spalding, LLP

(57) ABSTRACT

A system for generating a schedule by generating assignments for the tasks of a project and sequentially scheduling the individual assignments to available resources. First, input information is received which includes a resource calendar and a task list. A resource calendar identifies the resources available to work on a project and any constraints that are associated with the resources. A task list identifies the tasks that must be performed and any constraints that are associated with the tasks. At a minimum, the constraints associated with the tasks must identify each of the resources assigned to the task, and the work-amount that each resource must perform. Next, assignments are generated for each of the tasks. Each of the assignments identifies a specific resource and the work-amount required by the specific resource. Finally, each of the assignments are scheduled in accordance with the provided resource constraints identified in the resource calendar. The resulting schedule maximizes the utilization of the resources by scheduling on an assignment basis. The assignments are individually scheduled into the next available time-slot of the resources, thus, eliminating idle time where a resource is under-utilized.

9 Claims, 7 Drawing Sheets

Process 3 - Method 1

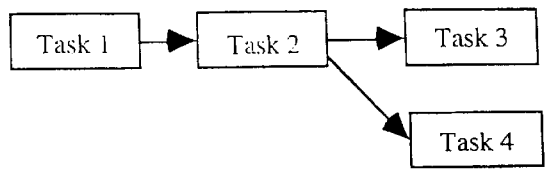

*Fig. 7a*

Group 3 Assignments Prior to Scheduling A2

| Asgmnt | Task | Resource | P.Cnt | P.Task | Scheduled |
|---|---|---|---|---|---|
| A1 | Task 1 | R1 | 0 | | Yes |
| A2 | Task 1 | R2 | 0 | | No |
| A3 | Task 1 | R3 | 0 | | Yes |

*Fig. 7b*

Group 4 Assignments Prior to Scheduling A2

| Asgmnt | Task | Resource | P.Cnt | P.Task | Scheduled |
|---|---|---|---|---|---|
| A4 | Task 2 | R1 | 1 | Task 1 | No |
| A5 | Task 2 | R2 | 1 | Task 1 | No |
| A6 | Task 2 | R3 | 1 | Task 1 | No |
| A7 | Task 2 | R4 | 1 | Task 1 | No |
| A8 | Task 3 | R3 | 2 | Task 2 | No |
| A9 | Task 3 | R4 | 2 | Task 2 | No |
| A10 | Task 4 | R1 | 2 | Task 2 | No |

*Fig. 7c*

Group 3 Assignments After Scheduling A2

| Asgmnt | Task | Resource | P.Cnt | P.Task | Scheduled |
|---|---|---|---|---|---|
| A1 | Task 1 | R1 | 0 | - | Yes |
| A2 | Task 1 | R2 | 0 | - | Yes |
| A3 | Task 1 | R3 | 0 | - | Yes |
| A4 | Task 2 | R1 | 0 | Task 1 | No |
| A5 | Task 2 | R2 | 0 | Task 1 | No |
| A6 | Task 2 | R3 | 0 | Task 1 | No |
| A7 | Task 2 | R4 | 0 | Task 1 | No |

*Fig. 7d*

Group 4 Assignments After Scheduling A2

| Asgmnt | Task | Resource | P.Cnt | P.Task | Scheduled |
|---|---|---|---|---|---|
| A8 | Task 3 | R3 | 1 | Task 2 | No |
| A9 | Task 3 | R4 | 1 | Task 2 | No |
| A10 | Task 4 | R1 | 1 | Task 2 | No |

*Fig. 7e*

SYSTEM AND METHOD FOR GENERATING A SCHEDULE BASED ON RESOURCE ASSIGNMENTS

TECHNICAL FIELD

The present invention is generally directed to computer programs for generating schedules and, more particularly, relates to a method for generating a schedule which is based on resource assignments, and optimally uses the available resources to complete a list of tasks.

BACKGROUND OF INVENTION

Scheduling programs have gained considerable popularity among project-oriented professions such as product engineering companies, construction firms, and manufacturing plants. Scheduling programs allow a project manager to organize and track the development of a project. In the most general sense, a scheduling program operates by receiving an input of project-related information, generating a schedule based on this information, and then graphically or in a tabular manner, displaying the details concerning the status of the project, projected completion date, anticipated delays, etc.

The critical path method (CPM) of scheduling is used in a significant number of scheduling programs. CPM scheduling generally operates by receiving a list of tasks, each task having varying restrictions or constraints, and generating a schedule based on the task restrictions or constraints. More specifically, a set of tasks are provided to the scheduling program. Each task represents a specific job or discrete amount of work that must be performed on a project. Additionally, each task has a set of restrictions or constraints which dictate when and how long the task should be performed. To generate a meaningful schedule, CPM scheduling requires the input of information which identifies when each task is to be performed. This information can be provided by specifying constraints such as: a start date and a finish date, a start date and a task duration, a task duration and a finish date, or a task duration and a start or finish date which is dependent upon another task. If this information is not specified, the typical CPM scheduling program will assume the start date for each task to be the current date, and the duration of the task will default to a specific granularity such as one day, one week, etc.

Linking information concerning one or more of the tasks may also be entered. For instance, if a project consists of three tasks (Task 1, Task 2, and Task 3), the user may specify that Task 1 must be completed before Task 2 and Task 2 must be completed before Task 3. This information can be provided in the form of entering a start date for Task 2, which is equivalent to the finish date for Task 1, or by specifying that the start date for Task 2 is dependent upon the completion of Task 1. The latter method is referred to as a link.

Once the user enters the task information, a CPM scheduling program generates a schedule based on the provided task constraints. This is accomplished by performing a forward pass in which each task is examined. At the completion of the forward pass, a schedule is created that starts on the start date of the first task that can be scheduled and satisfies all of the provided task constraints. Next, the critical path for the project is determined. The critical path can be defined as the longest duration path through the network of task dependencies. The critical path is calculated by performing a backward pass from the last finish date to the earliest start date.

CPM scheduling programs are most beneficial for projects in which the tasks have dependencies on each other. Because of this, they are well suited for product-oriented projects which inherently have tasks that must be performed in a specific order. As an example, in building a house, the tasks of laying a foundation, framing the house, and shingling the roofing must be performed in this order. There are, however, many situations where the order of performing certain tasks of a project are arbitrary. For instance, in publishing a news letter, the order in which the articles are written is arbitrary. CPM scheduling programs typically do not produce meaningful results when the tasks do not have dependencies. As an example, if the three tasks (Task 1, Task 2 and Task 3) are not required to be performed in any specific order (i.e., do not have any dependencies), a CPM scheduling program will generate a "flat schedule" as illustrated in Schedule Example 1.

```
                    Schedule Example 1
|----Task 1-----|

|----Task 2----------------------|

|----Task 3----------------------|
```

The problems associated with flat scheduling are evident when the tasks are viewed with respect to the resources assigned to the tasks. For instance, if a single resource is assigned to each of these three tasks, the flat schedule indicates that the resource will be required to work on three tasks at the same time. This results in "overloading" the resource. Alternatively, separate resources (Resource 1, Resource 2 and Resource 3) could be assigned to each of the three tasks respectively. This would result in a 100% utilization of Resource 2 and Resource 3; however, after the completion of Task 1, Resource 1 would be idle. This is referred to as "under-utilizing" a resource.

To avoid the generation of a flat schedule by a CPM scheduling program, the user is required to enter artificial dependency information such as links or start dates. Thus, to avoid the flat schedule shown in Schedule Example 1, the user could define the start date of Task 2 as dependent upon the completion of Task 1, and the start date of Task 3 as dependent upon the completion of Task 2. For projects with several tasks, this process may require a significant amount of effort for the user. Thus, there is a need for a scheduling program which can generate a meaningful schedule for a set of non-dependent tasks. Furthermore, there is a need for a scheduling program that can generate a meaningful schedule for a set of non-dependent tasks without requiring the input of artificial constraints such as start dates or dependencies.

A schedule in which resources are overloaded and/or under-utilized is referred to as an "unbalanced" schedule. As previously illustrated, CPM scheduling programs are susceptible to producing unbalanced schedules. One method that has been developed to address this deficiency in CPM scheduling programs is referred to as "leveling". The leveling process operates separately from the CPM scheduling and is designed to balance the resource utilization of a schedule. In this process, an overloaded resource is identified, and the task or tasks causing the first instance of the overload are determined. Next, adjustments are made to the start and/or finish dates of the task or tasks causing the overload to reduce the resource usage to 100%. Because this adjustment may result in changing the critical path, each time a leveling adjustment is made, the critical path must be recalculated before further leveling adjustments can be performed. Thus, for each leveling adjustment, a forward pass is performed to reschedule the tasks, and a backward pass is performed to recalculate the critical path. Depending on the number of tasks and the amount of overloading, this process can require a significant amount of iterative processing which wastes valuable processor time. Thus, there is a need for a method of scheduling which produces a balanced schedule. There is also a need for a method of scheduling that efficiently and quickly produces a balanced schedule which maximizes the use of the available resources.

CPM scheduling programs operate on a task-oriented basis. A problem that results from task-oriented scheduling is the tendency to under-utilize the available resources. The following example is illustrative of this problem. If the following information is provided to a CPM scheduling program:

Resource 1 (R1) is assigned to Task 1,

Resources 1 and 2 (R1,R2) are assigned to Task 2, and

Resource 2 is assigned to Task 3, upon completion of the scheduling process, the schedule shown in Schedule Example 1 would be created. Next, upon completion of the leveling process, a possible outcome of the schedule is shown in Schedule Example 2.

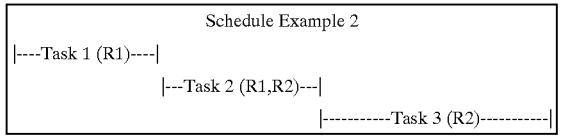

In Schedule Example 2, Task 2 has been scheduled to start upon the completion of Task 1 and Task 3 has been scheduled to start upon the completion of Task 2. Task 2 is scheduled to begin after Task 1 in order to avoid overloading of Resource 1. This results, however, in under-utilizing Resource 2, which is not scheduled during the time Resource 1 is working on Task 1. This under-utilization occurs as a result of using task-oriented scheduling. CPM scheduling with leveling would not allow Resource 2 to be scheduled to work on Task 2 in parallel with Resource 1 working on Task 1 because that would appear to overload Resource 1.

A second possible schedule that could result from the input information provided above is shown in Scheduling Example 3.

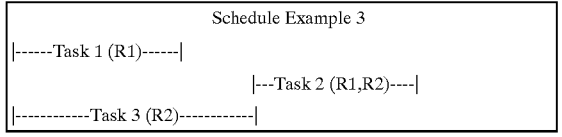

In Scheduling Example 3, Resource 2 has been scheduled to work on Task 3 in parallel with Resource 1 working on Task 1, and Task 2 has been scheduled to begin upon the completion of Task 3. In this schedule, Resource 1 is under-utilized during the time after the completion of Task 1 and prior to the start of Task 2. Again, the under-utilization occurs as a result of task-oriented scheduling. Because Resource 2 is assigned to both Task 2 and Task 3, Task 2 can not begin until the completion of Task 3.

An alternative to task-oriented scheduling is assignment-oriented scheduling. In Schedule Examples 2 and 3, Task 2 can be viewed as consisting of two assignments, one assignment for Resource 1 and another for Resource 2. By performing assignment-oriented scheduling in Schedule Example 2, Resource 2 could begin working on Task 2 in parallel with Resource 1 working on Task 1. The resulting schedule is shown in Schedule Example 4.

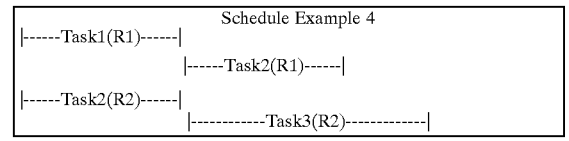

Likewise, by utilizing assignment-oriented scheduling in Schedule Example 3, Resource 1 can begin work on Task 2 upon the completion of Task 1, thereby avoiding the under-utilization of Resource 1. Scheduling Example 5 illustrates a schedule that could result from use of assignment-oriented scheduling.

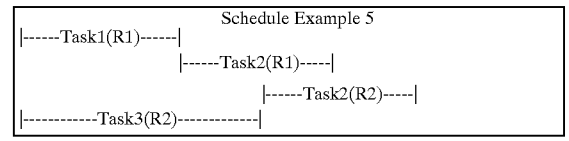

Thus, to allow for the most efficient allocation of resources, there is a need for a method to generate a schedule which is assignment-oriented rather than task-oriented. There is also a need for a method which allows the independent scheduling of individual assignments of a task. This is illustrated in Scheduling Example 4 and 5 by splitting Task 2 into two independent assignments.

CPM scheduling programs schedule tasks linearly, which contributes to the under-utilization of resources. Linear scheduling implies that once a task is started, work must continue on that task until it is completed. Thus, in Schedule Example 2, if the start of Task 2 is dependent upon the completion of Task 1, then Resource 2 could not work on Task 2 in parallel with Task 1 as illustrated in Schedule Example 4. Thus, Resource 2 will be under-utilized. An alternative to linear scheduling is to view each task as a series of smaller assignments which can be performed independently. For example, if the duration of Task 3 is one month, then Task 3 can be viewed as four (4) one week assignments or twenty (20) one day assignments. Each of these assignments can then be independently scheduled and Schedule Example 6 could result.

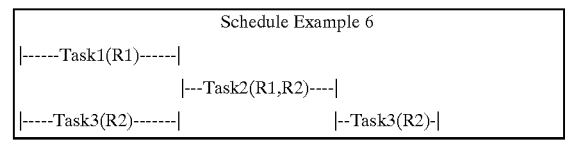

In Schedule Example 6, Task 3 has been subdivided into two assignments. The first assignment is performed in parallel with Task 1 to avoid the under-utilization of Resource 2 during this period of time. Because CPM scheduling utilizes linear scheduling, a CPM-based scheduling program could not subdivide Task 3 as illustrated. Thus, there is a need for a scheduling method which subdivides a task or assignment into components which can be individually scheduled, and generates a maximum resource utilization schedule based on these components.

Thus, there are several problems and deficiencies associated with CPM scheduling programs. Some of these problems, such as flat scheduling, can be alleviated by burdening the user with the requirement of creating artificial constraints upon the entered tasks. Other problems, such as the under-utilization of resources can not be alleviated within the constraints of CPM scheduling. Therefore, there is a need for an efficient method of scheduling that will generate meaningful schedules which maximize resource utilization by performing assignment-oriented scheduling.

SUMMARY OF THE INVENTION

The present invention satisfies the above-described needs by providing a system and a method for generating a schedule for completing the tasks of a project by sequentially scheduling individual assignments for a resource in accordance with a resource calendar. First information is received concerning the resources and the tasks. This information is then used as the basis for generating assignments, which can be individually scheduled to a resource, and a resource calendar that identifies available time-slots for each resource. Next, the assignments are sequentially scheduled, into available time-slots for the various resources assigned to the project. The resulting schedule is a balanced schedule which maximizes the utilization of the available resources.

One aspect of the present invention is a system and a method for generating assignments for a task and individually scheduling the assignments to a resource. In one embodiment, the assignments are generated based upon the task constraints associated with each task. The task constraints must identify the resources that are assigned to a task and either a required work-amount for each of these resources or a total work-amount for the task. The assignments are generated by dividing each task by the number of assigned resources and then identifying which resource is associated with which assignment. Next, the work-amount is identified for each assignment. One method to identify the work-amount is to equate the work-amount for each assignment to the work-amount identified in the task constraints. Another method is to divide the total work-amount for the task by the number of assignments and to set the work-amount for each assignment to this value. This aspect of the invention is advantageous because scheduling on an assignment basis allows resources to be scheduled at maximum utilization.

Another aspect of the present invention is a system and a method for generating a schedule which represents the order for a group of available resources to complete the tasks required for a project. First, input information is received which identifies the available resources and tasks that must be performed by these resources. A resource calendar identifies the resources available to work on a project and any constraints that are associated with the resources. A task list identifies the tasks that must be performed and any constraints that are associated with the tasks. At a minimum, the constraints associated with the tasks must identify each of the resources assigned to the task, and the work-amount that each resource must perform. Next, assignments are generated for each of the tasks. Each of the assignments must identify a specific resource and the work-amount required by the specific resource. Finally, each of the assignments are scheduled in accordance with the provided resource constraints identified in the resource calendar.

Alternative embodiments of the present invention may provide additional resource and task constraints. In one embodiment, the resource constraints can identify time-slots in which each of the resources are available to work on assignments. In another embodiment, the resource constraints can identify the earliest date that each of the resources are available to work on the assignments. In addition the task constraints can include one or more scheduling constraints which may limit the manner in which the assignments are scheduled.

The scheduling process of the present invention can be performed in several ways. In one embodiment of the present invention, the resource constraints identify time-slots for the resources. The time-slots are spans of time that assignments can be scheduled to the resources. The scheduling process then includes sequentially selecting each of the assignments which identify a particular resource, and associating the assignments with the first available time-slot in the resource calendar for that particular resource. After all of the assignments for that particular resource have been scheduled the process is repeated for each of the other resources. This process results in maximizing the utilization of the resource by eliminating idle times.

In another embodiment, the task constraints include at least one scheduling constraint which is used as a basis for placing the assignments into a scheduling order. The scheduling process then includes sequentially selecting the assignments in accordance with the scheduling order.

In yet another embodiment, the task constraints include one or more scheduling constraints. The assignments are then placed into groups based on a function of the scheduling constraints. Furthermore, a priority is assigned to each group based on another function of the scheduling constraints. Finally, each assignment in each group is ordered based on a specific function of the scheduling constraints identified for each group.

In still another embodiment, four functions are used to place the assignments into one of four groups. The first function forms a first group by selecting assignments of tasks with a scheduling constraint which identifies a date on which the task must start. The second function forms a second group by selecting assignments of tasks with a scheduling constraint which identifies a date by which the task must be completed. The third function forms a third group by selecting assignments of tasks which are not dependent on the completion of any other tasks. The fourth function forms a fourth group by selecting all of the remaining assignments.

The scheduling process for the above-described embodiment could include scheduling each of the assignments in the following manner. First, scheduling the assignments in the first group into a time-slot for the assigned resources which correspond with the date that the assignments must begin. Then, scheduling the assignments in the remaining groups by selecting an assignment from the third group and scheduling the selected assignment if: (1) there are no assignments in the fourth group with a higher priority; and (2) there are no assignments in the second group that could not be finished by the required date if the selected assignment is scheduled. If condition (1) is not valid, then the scheduling of the assignment selected from the third group is postponed. If condition (2) is not valid, then the assignments in the second group that could not be finished will be scheduled before the selected assignment is scheduled. In addition, if all of the assignments for a task have been scheduled, then any tasks that are dependent on the scheduled task are examined. If it is determined that any of these tasks are not dependent on any other unscheduled tasks, then all of the assignments for these tasks which are currently in the fourth group are moved to the third group. This process continues until all of the assignments have been scheduled.

In view of the foregoing, it will be appreciated that the present invention provides the advantage of generating a schedule which maximizes the utilization of available resources. It will also be appreciated that the present invention provides the advantage of generating a schedule which is assignment-oriented rather than task-oriented. It will also be appreciated that the present invention can generate a meaningful schedule for a set of non-dependent tasks without requiring the input of artificial constraints such as start dates or dependencies. It will also be appreciated that the present invention generates a balanced schedule. Furthermore, the present invention efficiently and quickly generates a balanced schedule which maximizes the utilization of available resources. It will also be appreciated that the present-invention subdivides a task or assignment into components which can be individually scheduled, and generates a maximum resource utilization schedule based on these components.

These and other aspects, features, and advantages of the present invention will be more clearly understood and appreciated from a review of the following detailed description of the present invention and possible embodiments thereof, and by reference to the appended drawings and claims.

BRIEF DESCRIPTION OF THE DRAWINGS

FIGS. 7a–e are diagrams illustrating the operation of a portion of the method illustrated in FIG. 5.

DETAILED DESCRIPTION

Figure 1:
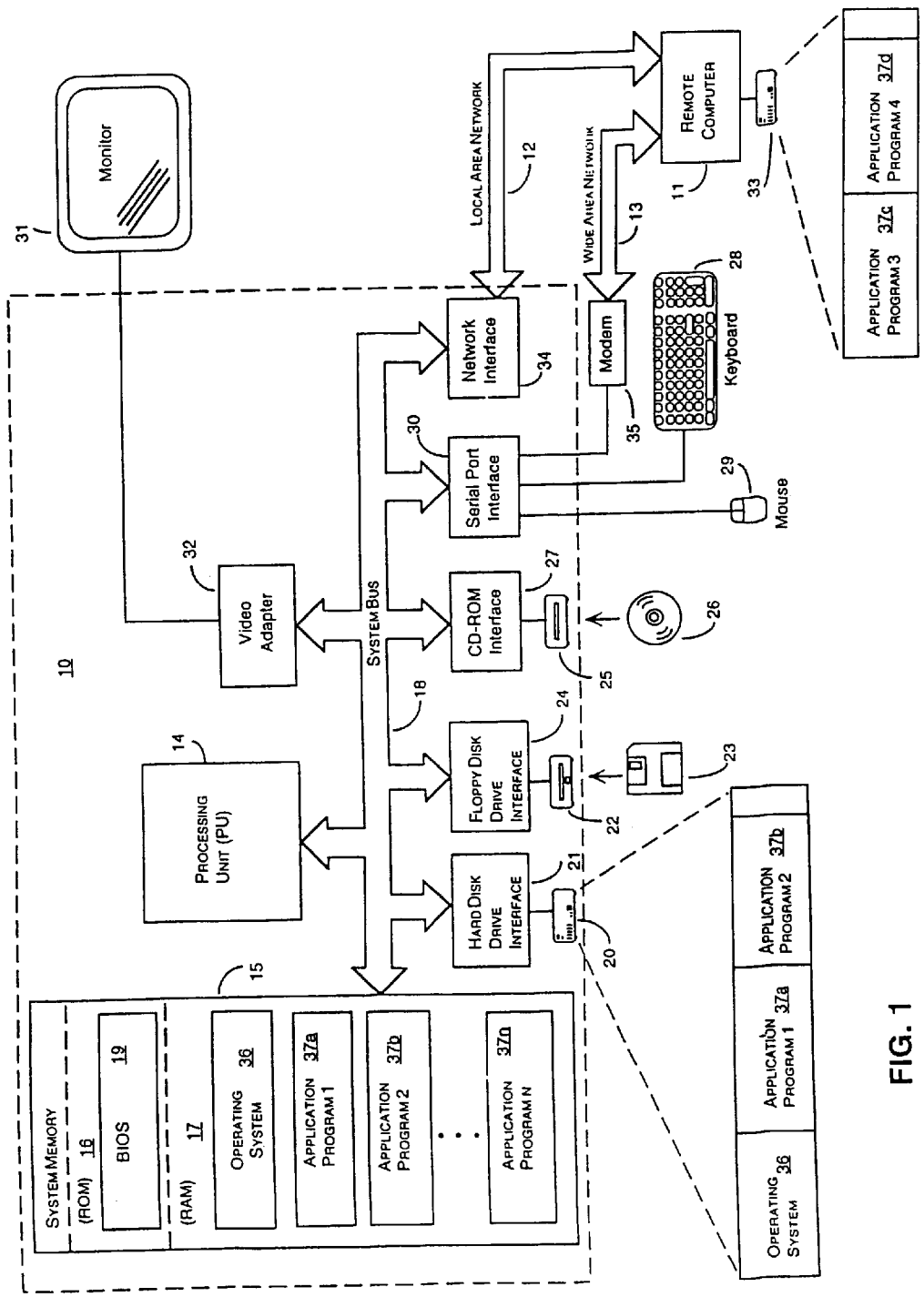
FIG. 1 is a block diagram of a conventional personal computer suitable for supporting the operation of the preferred embodiment of the present invention.

The present invention provides a system and a method to generate a meaningful schedule that maximizes resource utilization by performing assignment-oriented scheduling. The preferred embodiment of the present invention is represented by the "MICROSOFT TEAM MANAGER" program, a scheduling program published by Microsoft Corporation of Redmond, Washington. Briefly described, the preferred program allows users to enter information describing available resources and tasks, and then generates a schedule based on the input information. Advantageously, the preferred program utilizes an assignment-oriented approach for generating a schedule, which results in maximizing the utilization of resources. The preferred program is able to generate a balanced schedule by performing a single pass of the entered data. This capability improves the efficiency of the program by eliminating the re-iterative processes required by CPM scheduling programs.

Although the preferred embodiment will be generally described in the context of a program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including a processing unit (PU), memory storage devices for the PU, display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the PU via a communications network.

The processes and operations performed by the computer include the manipulation of signals by a PU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, data, flags, variables, parameters, objects, properties, tags, types, identifiers, values, elements, symbols, characters, terms, numbers, points, records, images, files, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, receiving, sending, transmitting, replying, etc. which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein. The specialized apparatus could consist of dedicated computer systems in a specific network architecture with hard-wired logic or programs stored in nonvolatile memory, such as read only memory, magnetic storage devices, or optical storage devices.

Referring now to the drawings, in which like numerals represent like elements throughout the several figures, aspects of the present invention and the preferred operating environment will be described.

The Operating Environment

FIG. 1 illustrates a conventional personal computer 10 suitable for supporting the operation of the preferred embodiment of the present invention. As shown in FIG. 1, the personal computer 10 may operate in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a processing unit (PU) 14, such as the 80486 or "Pentium" microprocessors manufactured by Intel Corporation of Santa Clara, Calif. The personal computer also includes system memory 15 (including read only memory (ROM) 16 and random access memory (RAM) 17), which is connected to the PU 14 by a system bus 18. The preferred computer 10 utilizes a BIOS 19 (Basic Input/Output System), which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors, such as the "MIPS" or "POWER PC" families of microprocessors from Silicon Graphics and Motorola, respectively. Additionally, the present invention is not limited to computers that utilize ROM or RAM for system memory. Other technologies such as electronically programmable ROM (EPROM), ultra-violet light erasable and electronically programmable ROM (UVEPROM), electronically erasable and programmable ROM (EEPROM), FLASH and bubble memory may also be used.

Within the personal computer 10, various devices may be connected to enhance the utility and performance of the personal computer. A local hard disk drive 20 may be connected to the system bus 18 via a hard disk drive interface 21. A floppy disk drive 22, which is used to read or write a floppy disk 23, may be connected to the system bus 18 via a floppy disk drive interface 24. A CD-ROM drive 25, which is used to read a CD-ROM disk 26, may be connected to the system bus 18 via a CD-ROM interface 27. A user enters commands and information into the personal computer 10 by using input devices such as a keyboard 28, and/or pointing devices such as a mouse 29. Typically, these input devices are connected to the system bus 18 via a serial port interface 30 or a parallel port interface (not shown in FIG. 1). Other types of pointing devices (not shown in FIG. 1) include track pads, track balls, pens, head trackers, data gloves, and other devices suitable for positioning a cursor on a computer monitor 31. A monitor 31 or other type of display device may be connected to the system bus 18 via a video adapter 32.

The personal computer may be connected to a network of other computers or devices. A remote computer 11 in a networked environment is connected to a remote memory storage device 33. This remote memory storage device 33 is typically a large capacity device such as a hard disk drive, CD-ROM drive, magneto-optical drive, or the like. The personal computer 10 may be connected to the remote computer 11 by a network interface 34, which is used to communicate over the local area network 12.

The personal computer 10 may also be connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to a remote computer 11 via either the local area network 12 and the wide area network 13 is not required, but merely illustrates methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, application programs 37a–n, and data are provided to the personal computer 10 via computer-readable media. In the preferred computer, the computer-readable media include the local or remote memory storage devices, which may include the local hard disk drive 20, floppy disk 23, CD-ROM 26, RAM 17, ROM 16, and the remote memory storage device 33. In the preferred personal computer 10, the local hard disk drive 20 is used to store data and programs, including the operating system and programs. The application programs 37a–n, may include commercially available utilities, public domain software utilities, computer games, etc. The preferred embodiment of the present invention, a scheduling program, is an example of one such application program.

The Operating System

Figure 2:
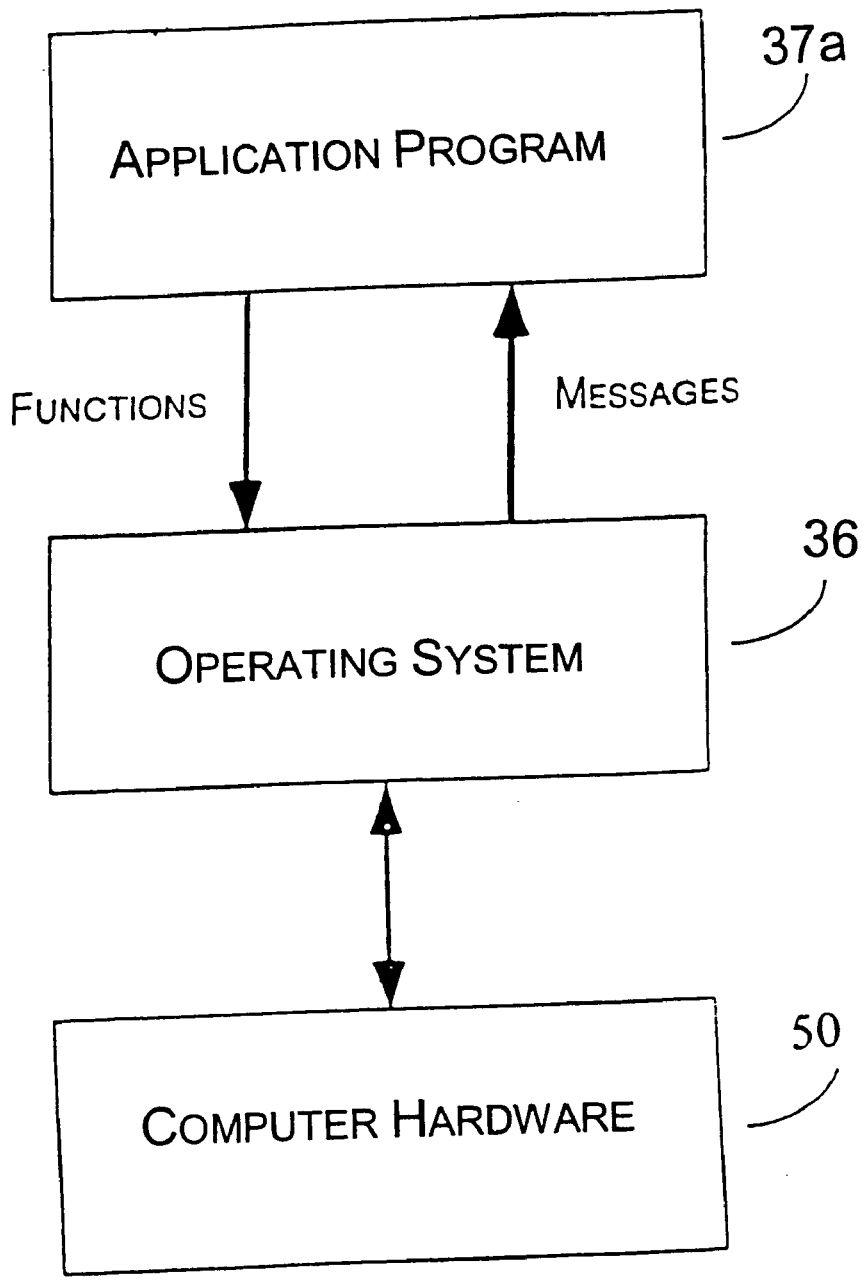
FIG. 2 is a block diagram illustrating the interaction between the preferred computer hardware, the preferred operating system, and an application program.

FIG. 2 is a simplified block diagram illustrating the interaction between the preferred computer hardware 50, the preferred operating system 36, and an application program 37a. Referring now to both FIGS. 1 and 2, when the personal computer 10 is turned on or reset, the PU 14 is forced to begin program execution at a specific memory location in the ROM 16. This specific memory location corresponds to the beginning of the bootstrap routine contained in the BIOS 19. The bootstrap routine functions to load the operating system 36 from the hard disk drive 20 into the RAM 17. Once the operating system 36 is loaded into RAM 17, the PU 14 executes instructions of the operating system 36 and causes the visual elements associated with the user interface of the operating system 36 to be displayed on the monitor 31.

The operating system 36, in conjunction with the BIOS 19 and associated device drivers, provides the basic interface between the computer's resources, the user, and the application program 37a. The operating system 36 interprets and carries out instructions issued by the user and/or application program(s). For example, when the user wants to load an application program 37a, the operating system 36 interprets the instruction (e.g., double clicking on the application program's icon) and causes the PU 14 to load the program code into RAM 17 from either the local hard disk drive 20, floppy disk 23, CD-ROM 26, or the remote memory storage device 33. Once the application program 37a is loaded into the RAM 17, it is executed by the PU 14. For larger programs, the operating system 36 causes the PU 14 to load various portions of program, or program modules, into RAM 17 as needed. In addition, several application programs (37a–n) can be loaded into RAM at the same time. In this scenario, the operating system 36 will switch the PU 14 execution time between applications based on user requests, application program request, or by a time-sliced allotment of the processing time of PU 14.

The operating system 36 provides a variety of functions or services that allow an application program 37a to easily deal with various types of input/output (I/O). This allows the application program 37a to issue relatively simple function calls that cause the operating system 36 to perform the steps required to accomplish various tasks, such as displaying text on the monitor 31 (FIG. 1) or printing text on an attached printer (not shown). Generally described (with reference to FIG. 2), the application program 37a communicates with the operating system 36 by calling predefined functions provided by the operating system 36. The operating system 36 responds by providing the requested information in a message, by executing a requested task, and/or by communicating with necessary hardware components 50.

From this brief description, it should be appreciated that operating systems, such as "WINDOWS 95" and "WINDOWS NT", are quite complex and provide a wide variety of services that allow users and programs to utilize the resources available in the personal computer. Those skilled in the art will be familiar with operating systems and their various features, which include, but are in no means limited to, the specific messages and functions described above. For more comprehensive information regarding the "WINDOWS 95" and "WINDOWS NT" operating system and its interaction with programs, the reader may refer to any of a variety of publications, including the "Win32 Programmer's Reference" and "Advanced Windows" published by Microsoft Press.

The preferred embodiment of the present invention is implemented in "MICROSOFT TEAM MANAGER" for "WINDOWS 97". It should be understood that the present invention can readily be implemented in other applications running under other operating systems, such as Microsoft Corporation's "Windows 3.1", IBM Corporation's "OS/2", UNIX based operating systems and the operating system used in "MACINTOSH" computers manufactured by Apple Computer, Inc.

Operation of the Preferred Program

Figure 3:
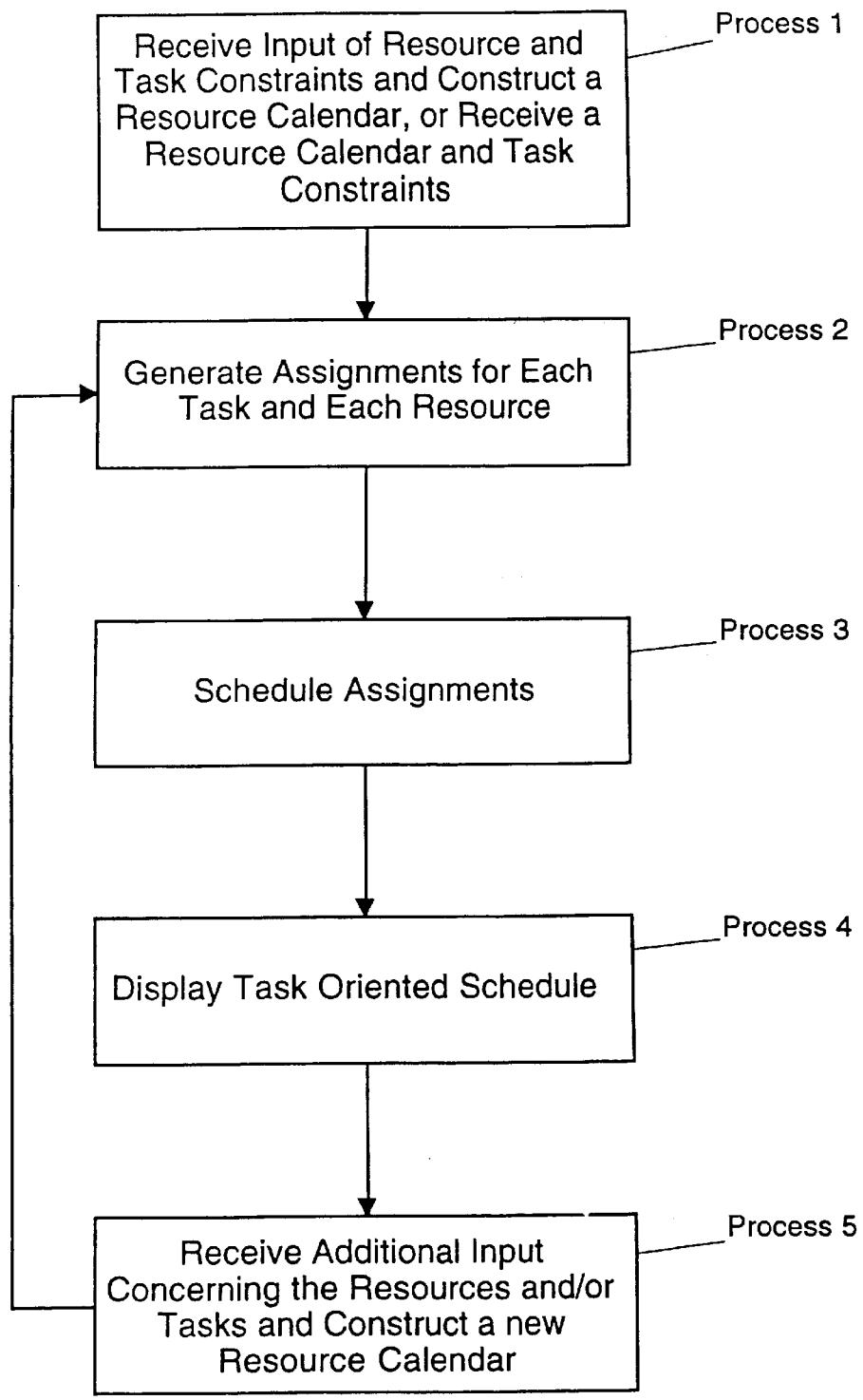
FIG. 3 is a flow diagram illustrating the five processes (Process 1–5) required in generating a schedule by the preferred program.

The preferred program accepts the input of information describing tasks that must be performed and resources which are assigned to these tasks. Next, the preferred program generates a schedule which optimally utilizes the resources to complete the tasks. In the most general sense, the preferred program can be described as consisting of five (5) processes. FIG. 3 is a flow diagram illustrating the five (5) processes required in generating a schedule by the preferred program.

Process 1: Receiving Input Information

Process 1 consists of receiving input information from a user or other source such as a magnetic medium. Two categories of information are required: resource information and task information. The resource information describes each resource that is available for the tasks of the project. The resources can include humans, specimens, equipment, office space or any other item that is required to perform the task. The only requirements imposed on the resource information are that each resource must be identified, and each time period in which the resource is available for scheduling must be provided. Optionally, other information may be provided to further describe the resource, such as the efficiency of the resource, special expertise, preferred work types, preferred work times, resource priorities, and other such information. This additional information can easily be incorporated into the preferred program and the preferred program is not limited to any specific set of information concerning the resources.

The task information identifies each of the tasks to be performed and any task constraints associated with these tasks. The task constraints must include the identification of each resource that is assigned to the task and the duration or work-amount that is required of the resource for that task. Optionally, the task information can include other information, such as scheduling constraints, to further describe the tasks. This information is optional because it is superfluous for the operation of the present invention. In contrast, CPM scheduling techniques, as previously mentioned, require the input of information which can identify the starting and ending dates of each task. In the absence of this information, CPM scheduling programs may generate a flat schedule, and at best, an unbalanced schedule. The preferred program, however, will generate a balanced schedule even if this information is not provided.

Several types of scheduling constraints may be included, some of which are described in Table 1.

TABLE 1

Scheduling Constraints

| SCHEDULING CONSTRAINTS | DESCRIPTION |
| --- | --- |
| must-finish-by | Indicates the date on which a task must be completed. |
| dependencies | Indicates that the start date or completion date of one task (dependent task) may be determined by the start or completion date of another task (predecessor task). |
| start-on | Indicates the date at which a task must start. |
| start-on-or-after | Indicates the date at which a task must start on or after. |
| task priority | Indicates a priority level that has been assigned to a task, such as high, medium, or low. |
| assignment limit | Indicates limitations in assigning a resource to a task and may take the form of "no more than", no less than", "exactly", etc. (e.g., Resource 1 can work on Task 1 no more than X hours per day and no less than Y days per week) |
| creation | Identifies the date and time at which a task was created or provided to the scheduling program. |

It should be clear to the reader, that the numbers, types and combinations of scheduling constraints are limitless. Any of the identified scheduling constraints and others can be incorporated in the preferred program. Therefore, the present invention is not limited to any specific set or subset of scheduling constraints.

Once the resource and task information have been entered, the preferred program generates a resource calendar. The resource calendar is used for presenting the resource information to the remaining processes in a usable format. The specific format utilized for this information is arbitrary. For instance, one method is to provide a single calendar containing all of the resource information. Another method is to provide a separate calendar for each resource. Furthermore, the granularity of the calendar can vary depending upon the specific type of application. Thus, the granularity of the calendar can be in weeks, days, hours or any other granularity or combination of two or more. The length of the calendar can also vary depending on the type of application. Thus, it is anticipated that calendars spanning weeks, months, years, etc., can be generated and utilized within the constraints of the present invention. In an exemplary embodiment, the resource availability information is entered by modifying or defining a calendar for each resource. The resource calendar for an exemplary embodiment utilizes a granularity of fifteen (15) minutes and a span of six (6) months from the first date the resource is available. Thus, in an exemplary embodiment, Process 1 includes receiving a resource calendar and task constraints.

Process 2: Generate Assignments

Process 2 consists of generating assignments for each of the tasks and each resource assigned to those tasks. This process consists of breaking each task (parent task) into its component assignments. The component assignments can then be independently scheduled as described in the following processes. This approach is different from CPM scheduling methods, which schedule an entire task rather than component assignments. The component assignments can be defined in several methods. One method is to define a component assignment as the work-amount for each resource assigned to the parent task. Another method is to define several component assignments of fixed duration for each resource where the sum of each fixed duration is equal to the resource's work-amount. Other methods could also be utilized for defining the component assignments, and the present invention is not limited to any specific method.

Each of the component assignments must identify the parent task of the component assignment, the assigned resource, and the work-amount required by the assigned resource or the duration of the assignment. Additionally, to ensure that each component assignment can be independently scheduled, each of the component assignments should inherit the task constraints and scheduling constraints of the parent task. Thus, at the completion of Process 2, a list of assignments which can be individually scheduled are generated. These assignments are then used as input to the remaining processes.

Tables 2 and 3 illustrate the result of one possible implementation of this process. The actual results depend on the method utilized in defining the component parts. This example is provided for illustrative purposes only and does not limit the present invention to a specific method or a specific data structure.

Table 2 shows three tasks (Task 1, Task 2, Task 3), the resources assigned each task, and any constraints imposed on the tasks. Table 3 shows the assignments generated from the information provided in Table 2. Each assignment in Table 3 identifies a resource, a parent task, a duration, and the constraints associated with the parent task. As a specific example, Task 1 in Table 2 results in two (2) assignments in Table 3 (Resource 1/Task 1 and Resource 2/Task 1).

TABLE 2

Tasks

| Task Name | Assignments | Constraints |
| --- | --- | --- |
| Task 1 | Resource 1: 2 days<br>Resource 2: 1 day | Start on 1/1/97 |
| Task 2 | Resource 1: 5 days | Start after Task 1 |
| Task 3 | Resource 2: 5 days | |

TABLE 3

Assignments

| Resource | Parent Task | Duration (work-amount) | Constraint |
| --- | --- | --- | --- |
| Resource 1 | Task 1 | 2 days | Start on 1/1/97 |
| Resource 1 | Task 2 | 5 days | Start after Task 1 |
| Resource 2 | Task 1 | 1 day | Start on 1/1/97 |
| Resource 2 | Task 3 | 5 days | |

Process 3: Schedule Assignments

Process 3 consists of scheduling each of the individually scheduled assignments in the assignment list, in accordance with the resource calendar or calendars. At least two methods have been identified for performing this process.

Figure 4:
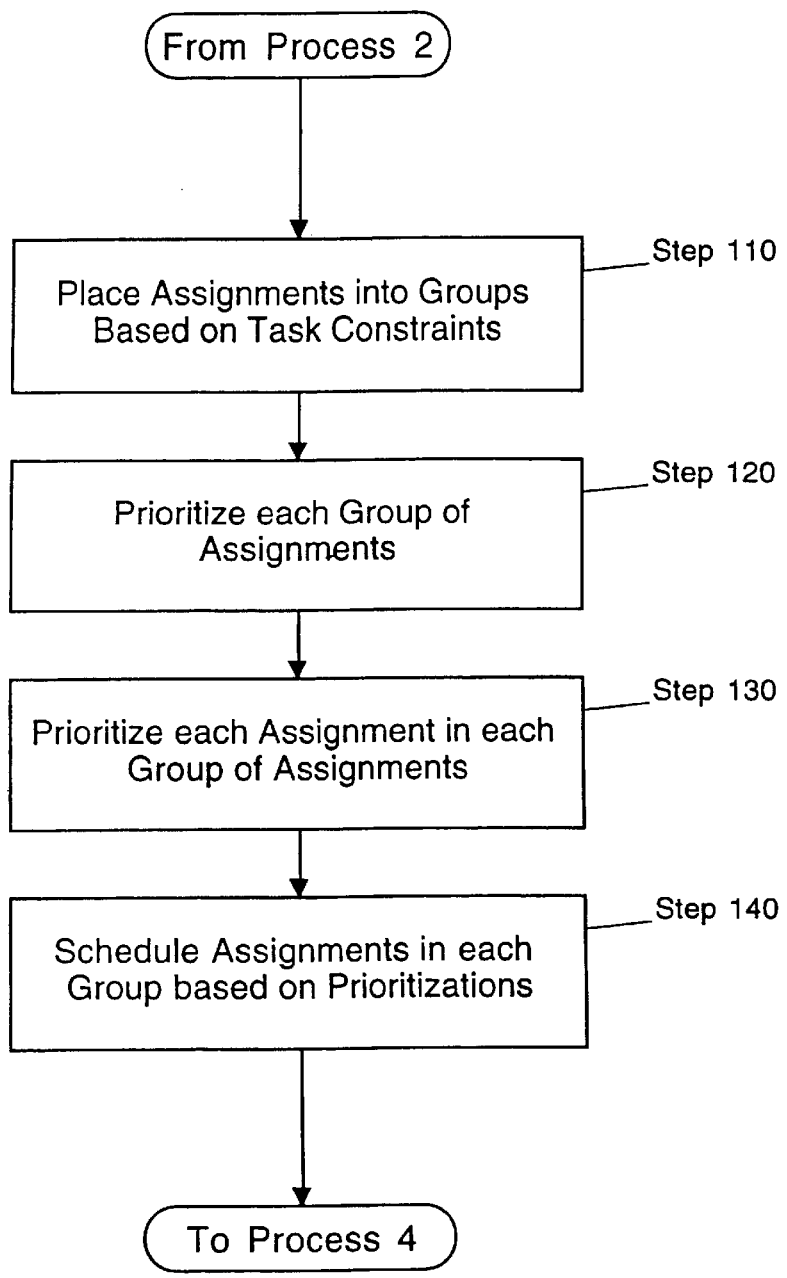
FIG. 4 is a flow diagram illustrating a first embodiment of a method for scheduling assignments.

FIG. 4 is a flow diagram illustrating a first method of Process 3 for scheduling the assignments. In Step 110, each of the assignments are grouped based on their scheduling constraints. The algorithm utilized in grouping the assignments can take on any form and can vary with the number and types of scheduling constraints provided. As a first example, if each task has a task priority scheduling constraint, the assignments can be grouped based on the value of the task priority. Thus, all assignments with a high priority would be placed into a first group, assignments with a medium priority would be placed into a second group, and assignments with a low priority would be placed into a third group. As a second example, predecessor tasks (i.e., tasks which have one or more dependent tasks) may be placed into a first group, dependent tasks which have one or more additional dependent tasks may be placed into a second group, dependent tasks which have no additional dependent tasks may be placed into a third group, and independent tasks (tasks which do not have a predecessor task or a dependent task) may be placed into a fourth group. As a third example, the assignments may be grouped based on the resource that is associated with the assignment. Thus, each group would contain all the assignments for one particular resource.

In Step 120, the groups of assignments are prioritized. This step is used to identify which group of assignments will be scheduled first or will be given the highest priority during the scheduling process. This step may be eliminated if Step 110 is sufficient to define the ordering of the groups. For instance, in the first grouping example, the task priority utilized in identifying the groups may also determine the priority of the group. Alternatively, additional resource or scheduling constraints may be employed in determining the priority of the groups. For example, if the groups are based on assigned resources, such as described in the third grouping example, groups associated with resources that have fixed or limited times of availability may be given higher priority over other groups. Thus, if a resource, such as a specialized piece of equipment, is only available for the first 3 months of a project, then the assignments associated with that resource can be given a higher priority.

In Step 130, the assignments in each of the groups are given a priority-order. Similar to the algorithms for identifying the groups in Step 110, the algorithm utilized in assigning a priority-order can take on any form and will vary with the number and types of scheduling constraints provided. As an example, for the first grouping example based on task priorities, the priority-order of the assignments in each group may simply consist of the order in which the tasks were created. Alternatively, an algorithm can assign a priority-order based on any provided scheduling constraints, such as start-on dates, must-finish-by dates and start-on-or-after dates. The skilled programmer will recognize that a number of algorithms could be developed for performing the grouping, identifying the priority of the groups, and assigning a priority-order for the assignments within the groups. The present invention is not limited to any particular algorithm for performing these steps.

In Step 140, the assignments are scheduled based on the groups, group priority, and the priority-order of the assignments. In this process, each assignment in the highest priority group is sequentially scheduled in the available time-slots of the resource associated with that assignment. Alternatively, the scheduling can be performed for one resource at a time. In this method, a first resource is selected. Next, the highest priority assignment associated with the selected resource is selected from the highest priority group. This assignment is then scheduled into the next available time-slot for the selected resource. This process continues until all of the assignments for the selected resource have been scheduled.

When all of the assignments for a resource have been scheduled, the next resource is selected and this process is repeated until all of the assignments have been scheduled for each resource.

Figure 5:
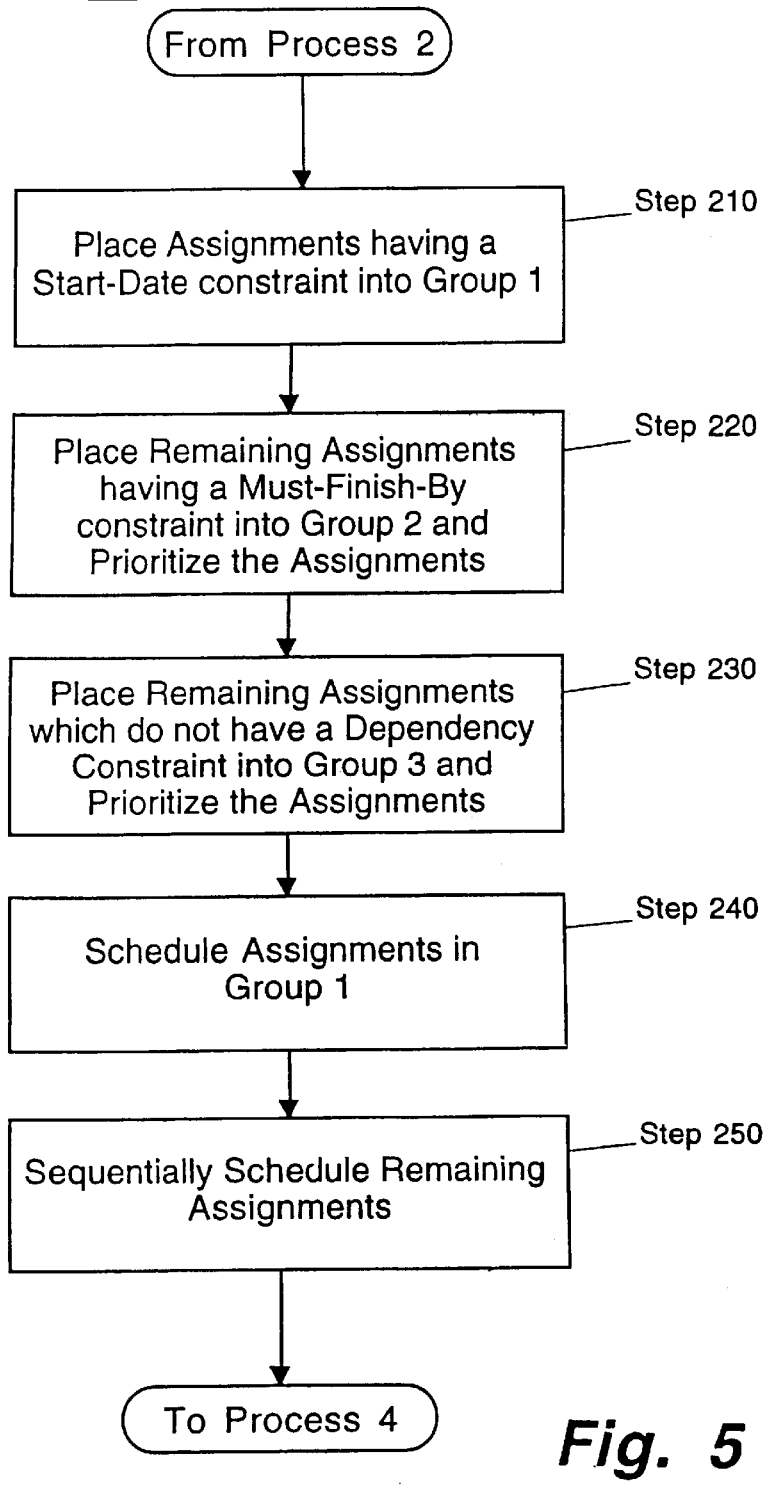
FIG. 5 is a flow diagram illustrating a second embodiment of a method for scheduling assignments.

FIG. 5 is a flow diagram illustrating the second method of Process 3 for scheduling the assignments. This method is more specific than the method illustrated in FIG. 4. Beginning in Step 210, a first group (Group 1) of assignments is formed which consists of all the assignments having a start-on scheduling constraint. In Step 220, all of the remaining assignments are examined and a second group (Group 2) of assignments having a must-finish-by scheduling constraint is formed. In Step 230, all of the assignments that are not included in Group 1 are examined and a third group (Group 3) is formed which consists of independent assignments (assignments which do not have a predecessor assignment). The remaining assignments are then placed into a fourth group (Group 4). Thus, at the completion of step 230, four groups of assignments are formed as follows:

Group 1: all assignments with start-on scheduling constraint;

Group 2: all assignments without a start-on scheduling constraint but have a must-finish-by scheduling constraint;

Group 3: all independent assignments that do not have a start-on scheduling constraint; and Group 4: all dependent assignment that do not have a start-on scheduling constraint.

Furthermore, the reader will identify that Group 1 is mutually exclusive with Group 2, Group 3 and Group 4. Also, Group 3 is mutually exclusive with Group 4. Finally, each of the Group 2 assignments is also included in either Group 3 or Group 4.

In Step 240, the Group 1 assignments are scheduled. For each of the Group 1 assignments, an amount of time is blocked out on the resource calendar for the assigned resource. The amount of time blocked out corresponds with the work-amount identified for that assignment. If the assigned resource is not available for the time identified by the start-on scheduling constraint, the assignment can either be scheduled earlier in time, or scheduled at the identified start-on date with an indication being provided that a scheduling conflict is present. Once all of the Group 1 assignments have been scheduled, processing then continues at Step 250. In Step 250, the assignments in each of the other groups are scheduled.

Figure 6:
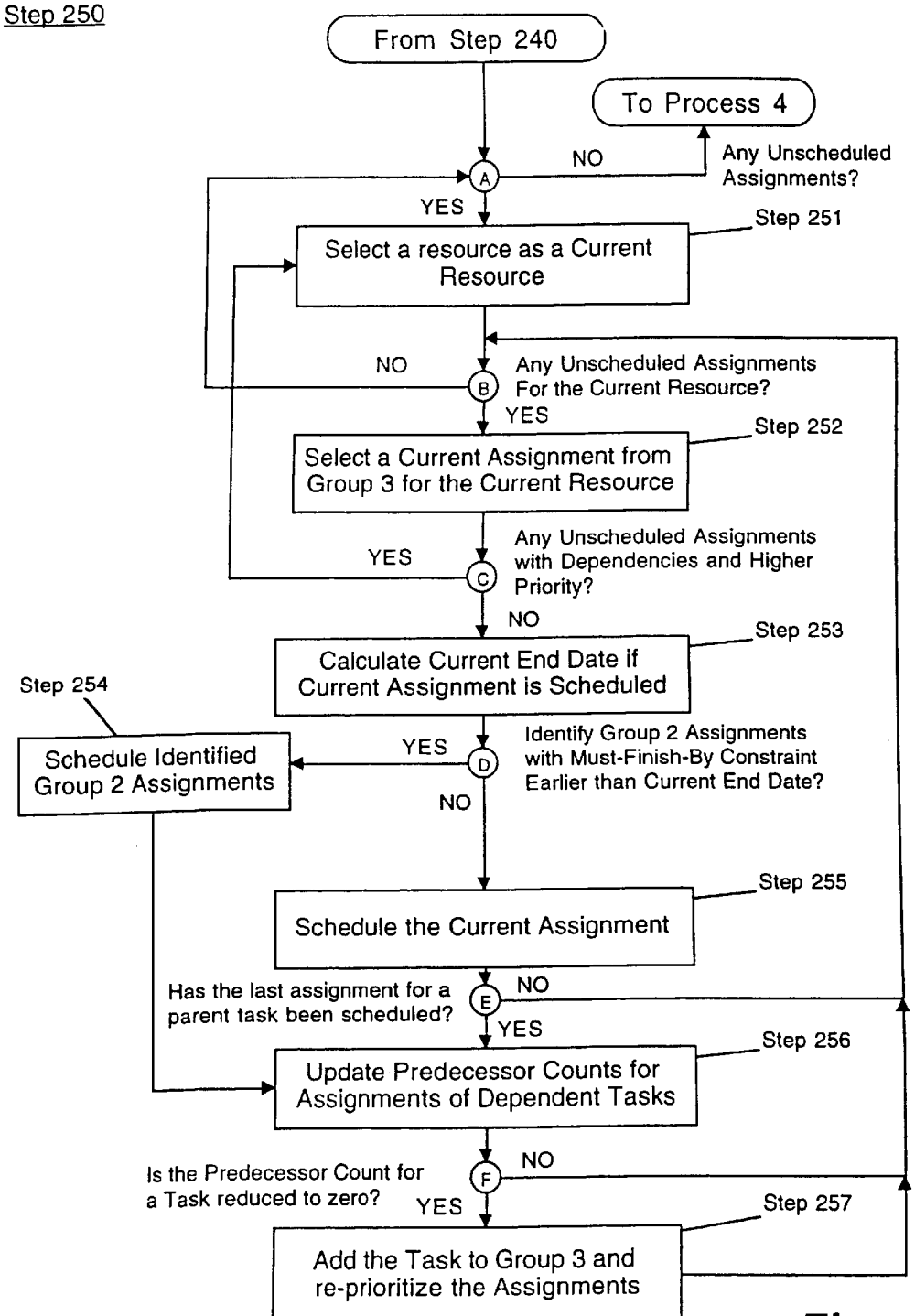
FIG. 6 is a flow diagram illustrating the details of the scheduling step 250 of FIG. 5.

FIG. 6 is a flow diagram illustrating the details of Step 250 for sequentially scheduling remaining assignments. Beginning at Point A, if any unscheduled assignments are remaining, then Step 251 is performed, otherwise, the scheduling process is completed and Process 4 of FIG. 3 is entered. In Step 251, the next resource is selected as the Current Resource. The order of selecting the resources may be based on a priority assigned to each resource or it may be performed arbitrarily. Either method is supported by the invention and the selection of any one method does not limit the invention in any manner. Upon selecting the Current Resource, processing continues at Point B.

At Point B, if all of the assignments for the Current Resource have been scheduled, then processing returns to Point A. But, if any unscheduled assignments remain for the Current Resource, then Step 252 is performed.

In Step 252, the next assignment from Group 3 is selected as the Current Assignment. The order of selecting assignments from Group 3 may be based on a priority-order assigned to each assignment in Group 3 or it may be performed arbitrarily. Either method is anticipated by the invention and the selection of any one method does not limit the invention in any manner. Upon selecting a Current Assignment for the Current Resource, processing continues at Point C.

At Point C, the assignments in Group 4 are examined to determine if there are any unscheduled assignments for the Current Resource that have a higher priority than the Current Assignment. This determination can be performed in several ways and any specific method is not considered to limit the overall operation of this invention. One possible method would be to assign a priority-order to each assignment based on one or more scheduling constraints. For instance, if each tasks includes a task priority, the priority-order could be equated to the task priority. Alternatively, the order that the tasks were entered may be used in making this determination. Another method would be to employ a heuristic which would assign a priority-order based any scheduling constraints that have been provided. For instance, each scheduling constraint could be identified with a weighting factor. The heuristic would then examine the scheduling constraints associated with each assignment and assign a priority value based on the assigned weights of the scheduling constraints. Regardless of the method employed at Point C, if Group 4 contains an unscheduled assignments with a higher priority than the Current Assignment, then scheduling for the Current Resource is suspended and processing continues at Step 251 where the next resource is selected as the Current Resource. If the Current Assignment is the highest priority assignment remaining to be scheduled for the Current Resource, the processing continues at Step 253.

In Step 253, a Current End Date is calculated. The Current End Date identifies the latest date of completion of all scheduled assignments and under the assumption that the Current Assignment has also been scheduled. Upon calculating the Current End Date, processing continues at Point D.

At Point D, each of the assignments in Group 2 are examined to determine if any assignments for the Current Resource have a must-finish-by scheduling constraint that is earlier than the Current End Date. If so, processing continues in Step 254 where each of these Group 2 assignments are scheduled prior to continuing at Point E. If there are no Group 2 assignments that meet this criteria, then processing continues at Step 255.

In Step 255, the Current Assignment is then scheduled. The scheduling of the Current Assignment includes identifying the next or earliest unscheduled time-slot in the resource calendar for the Current Resource. Next, the date associated with the beginning of the next available time-slot becomes the start date for the Current Assignment. If the length of the time-slot is greater than the work-amount for the Current Assignment, then a portion of the time-slot containing enough time to cover the work-amount is blocked out of the time-slot. If the length of the time-slot is less than the work-amount, then the entire time-slot is blocked out. Because only a portion of the Current Assignment is scheduled if the time-slot is less than the work-amount, the next unscheduled time-slot in the resource calendar for the Current Resource must be identified. This process will continue until the entire Current Assignment has been scheduled. Once the Current Assignment has been scheduled, processing continues at Point E.

At Point E, all of the remaining unscheduled assignments in Group 4 are examined to determine if any additional assignments associated with the same parent task as the Current Assignment remain unscheduled. If additional assignments remain, then processing returns to Point B to determine if all assignments for the Current Resource have been scheduled. However, if the. Current Assignment is the last assignment for the parent task, then all the assignments associated with any tasks that are dependent on the parent task of the Current Assignment are identified. The goal of this process is to determine if the assignments for any of the tasks in Group 4 should be moved into Group 3. An assignment should be moved from Group 4 to Group 3 when all of the assignments of each predecessor task of a Group 4 assignment have been scheduled. Thus, if a Group 4 task is dependent only on the parent task which has just been completely scheduled, then the assignments for the Group 4 task should be moved into Group 3 to be scheduled.

Several methods could be employed for performing this function. One method would be to include a predecessor count with each assignment. The predecessor count would indicate the number of tasks that the assignment depends from. Once all of the assignments for a predecessor task have been scheduled, the predecessor count for each assignment that is dependent upon the predecessor task would be decremented by one. When the predecessor count for an assignment reaches zero, then the assignment would be moved from Group 4 to Group 3. It is anticipated that other methods for performing this function could be utilized and the present invention is not limited to any specific method. For illustrative purposes, the use of a predecessor count has been illustrated in FIG. 6.

At point E, if all the assignments for a parent task of the Current Assignment scheduled in Step 255 or a Group 2 assignment scheduled in Step 254 have been scheduled, then processing continues at Step 256.

In Step 256, the predecessor counts are updated. This step consists of identifying all of the tasks that are dependent upon a parent task of which all the assignments have been scheduled in either Step 254 or Step 255. This includes all of the tasks which have a dependency chain that includes the parent task. For instance, if Task 1 is dependent upon Task 2, Task 2 is dependent upon Task 3, Task 3 is dependent upon Task 4, and Task 4 is dependent upon the parent task, then Task 1–4 have a dependency chain that includes the parent task. Next, the predecessor counts for each assignment corresponding to a task which is dependent upon the parent task of the Current Assignment are decremented. After updating the predecessor counts, processing continues at Point F.

At Point F, if the predecessor counts for any assignments are reduced to zero, then processing continues at Step 257. Otherwise, processing continues at Point B.

In Step 257, the assignments having a predecessor count of zero are removed from Group 4 and placed into Group 3. In addition, if the assignments in Group 3 are subject to a priority-order, then the assignments are re-ordered with the inclusion of the additional assignments.

FIGS. 7a–e are diagrams illustrating an example of the process performed in Steps 256–257. FIG. 7a, is a dependency tree diagram for four tasks (Task 1–Task 4). In this example, Task 2 is dependent upon Task 1, and Tasks 3 and 4 are dependent upon Task 2. FIG. 7b is a table providing pertinent information concerning the Group 3 assignments. FIG. 7c is a table providing pertinent information concerning the Group 4 assignments. In FIG. 7c, each of the assignments associated with Task 1 have been scheduled with the exception of Assignment 2. If Assignment 2 is the Current Assignment, upon scheduling Assignment 2, all of the assignments for Task 1 will be scheduled. At this point, the Group 4 assignments are examined to determine which assignments were dependent upon Task 1. Because Task 2 is directly dependent upon Task 1, each of the predecessor counts for the Task 2 assignments (Assignments 4–7) are decremented by one. Furthermore, because Task 3 and Task 4 are indirectly dependent upon Task 1 (i.e., they are dependent on Task 2 which is dependent on Task 1) then each of the predecessor counts for Task 3 and Task 4 assignments are decremented by 1. Finally, if the predecessor counts of any Group 4 assignments have been decremented to zero, then they are moved into Group 3. In this example, the Task 2 assignments (Assignments 4–7) will be moved into Group 3. FIGS. 7d–e illustrate the results after Assignment 2 has been scheduled. FIG. 7d illustrates that Assignments 4–7 have been moved into Group 3. FIG. 7e illustrates that the predecessor counts for Assignments 8–10 have been decremented by 1 but they remain in Group 4.

Upon the completion of Step 257, or if processing returns to Point B for any other reason, Group 2 and 3 are examined to determine if any assignments for the Current Resource remain unscheduled. If an unscheduled assignment is detected in Group 3, then processing continues as described above for Step 252. If there are no unscheduled Group 3 assignments but one or more unscheduled Group 2 assignments, then the Group 2 assignments are scheduled as described above-for Step 254. Upon completing the scheduling of these Group 2 assignments, processing continues at Point E as described above.

If processing returns to Point B when there are no remaining unscheduled Group 2 or Group 3 assignments for the Current Resource, the processing continues at Point A. As described above for Point A, if any unscheduled assignments remain, then a new Current Resource is selected in Step 251 and processing returns again to Point B. Thus, the processing will continue until all of the assignments for each of the resources have been scheduled. Upon scheduling all of the assignments, Process 4 will be entered.

Process 4: Display Schedule

In Process 4, the schedule generated in Process 3 is displayed. The specific format for displaying the schedule can vary in style and content. Furthermore, depending on the purpose for viewing the schedule (i.e., the project manager for determining the project status or a resource determining which assignment to work on next), the display may be customized to suit a particular need. The preferred program provides the capability of viewing the schedule in several formats and with varying levels of detail. Thus, the invention is not intended to be limited to a specific format for displaying of the schedule.

Process 5: Receive Additional/Modified Input

In Process 5, the preferred program allows the input of additional information or the modification of previously entered data. Upon the entry of additional or modified information, processing returns to Process 2 in order to regenerate the schedule based on the new information.

From the foregoing description, it will be appreciated that the present invention provides a method and a system to generate a meaningful schedule which maximizes resource utilization by performing assignment-oriented scheduling for a list of tasks. Although the present invention has been described as embodied within a scheduling program, it will be appreciated that the present invention can be utilized in any type of application performing scheduling functions. Indeed, the present invention is not limited to any particular application.

The present invention may be conveniently implemented in one or more program modules. No particular programming-language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers and program modules that can be used to practice the instant invention, it is not practical to provide a representative example of a computer program that would be applicable to these many different systems. Each user of a particular computer would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers regardless of the application.

Alternative embodiments will become apparent to those skilled in the art to which the present invention pertains without departing from its spirit and scope. Accordingly, the scope of the present invention is described by the appended claims and supported by the foregoing description.

I claim:

1. A computer-readable medium having computer-executable instructions for performing a method for creating an assignment-oriented schedule, the method comprising the steps of:
   a. receiving input information comprising:
      a resource calendar which identifies resources, available time-slots for each of the resources, and an earliest start date for each of the resources, and
      a task list which identifies tasks, each of the tasks having a set of task constraints and a priority which is a function of the task constraints, each set of task constraints identifying at least one resource assigned to the task associated with the set of task constraints and a work-amount for each of the assigned resources;
   b. generating assignments for each of the tasks, each of the assignments representing a component of a task and identifying a specific assigned resource, a specific work-amount required by the specific assigned resource, the task from which the assignment is generated as a parent task, and a predecessor count indicating a number of predecessor tasks upon which the assignment depends;
   c. ordering the assignments by:
      1. identifying a first assignment group comprising assignments having a start-on scheduling constraint in the set of task constraints of their corresponding parent task,
      2. identifying a second assignment group comprising assignments having a must-finish-by scheduling constraint in the set of task constraints of their corresponding parent task and which are not identified for the first assignment group;
      3. identifying a third assignment group comprising assignments having a predecessor count with a value of zero and which are not identified for the first assignment group, and
      4. identifying a fourth assignment group comprising assignments which are not identified for one of the first and third assignment groups;
   d. scheduling each of the assignments in the first assignment group into a time-slot for the assigned resource which corresponds with the start-on scheduling constraint for each respective assignment; and
   e. scheduling remaining unscheduled assignments by:
      1. selecting a first resource as a current resource,
      2. selecting a first assignment from the third assignment group as a current assignment, the current assignment identifying the current resource,
      3. if there is an unscheduled assignment in the fourth assignment group which identifies the current resource and has a higher priority than the current assignment, then selecting a next resource as the current resource and continuing at step e2,
      4. calculating a current end date based on all of the assignments that have been scheduled and the current assignment as though it has been scheduled,
      5. if any assignments in the second assignment group identify the current resource and have a must-finish-by scheduling constraint that identifies a date earlier than the current end date, scheduling any such assignments in the second group into the first available time-slot for the current resource and continuing at step e7,
      6. scheduling the current assignment in the first available time-slot for the current resource,
      7. if all of the assignments having a common parent task have been scheduled:
         decrementing the predecessor counts for each of the assignments which are dependent upon the common parent task, and
         moving all of the assignments in the fourth assignment group, which have a predecessor count equal to the value of zero, to the third assignment group,
      8. selecting a next assignment from the third assignment group as a current assignment, the current assignment identifying the current resource, and repeating steps e3 through e8 until all of the assignments in the third assignment group which identify the current resource have been scheduled, and
      9. selecting a next resource as the current resource and repeating steps e2 through e9 until all of the assignments have been scheduled.

2. A computer-readable medium according to claim 1, wherein the method further comprises the steps of:
   receiving a new set of resource constraints for a resource, the new set of resource constraints replacing an original set of resource constraints for the resource; and
   rescheduling each of the assignments in accordance with the set of resource constraints for its corresponding specific assigned resource and the task constraints for its corresponding parent task.

3. A computer-readable medium according to claim 1, wherein the method further comprises the steps of:

receiving a new set of task constraints for a task, the new set of task constraints replacing an original set of task constraints for the task; and rescheduling each of the assignments in accordance with the resource constraints for its corresponding specific assigned resource and the task constraints for its corresponding parent task.

4. A computer system for creating an assignment-oriented schedule, comprising:

a processing unit;

a memory storage device;

an input device coupled to said processing unit for receiving information;

a pixel-based display device coupled to said processing unit for displaying data; and a program module, stored in the memory storage device, for providing instructions to the processing unit, the processing unit, responsive to the instructions of the program module, operative for:

a. receiving, from the input device, input information comprising:

a resource calendar which identifies resources available for scheduling, available time-slots for each of the resources, and an earliest start date for each of the resources, and a task list which identifies tasks to be performed, each of the tasks having task constraints, a priority-order which is a function of the task constraints, and a predecessor count, the task constraints comprising a list of assigned resources for each of the tasks, a work-amount for each of the assigned resources, and at least one scheduling constraint;

b. generating assignments for each of the tasks, each of the assignments identifying a specific assigned resource, a specific work-amount, and a parent task;

c. scheduling each of the assignments that have a parent task with a start-on scheduling constraint into a time-slot of the resource calendar for its specific assigned resource, the time-slot corresponding with the start-on scheduling constraint;

d. scheduling each of the assignments not previously scheduled by:

1. selecting a first resource from the resources as a current resource, 2. if at least one unscheduled assignment exists which identifies the current resource as the specific assigned resource, has a parent task with a predecessor count equal to zero, and has a priority-order greater than all other unscheduled assignments which identify the current resource as the specific assigned resource and have a parent task with a predecessor count greater than zero:

selecting a current assignment from the unscheduled assignments which identifies a parent task having a predecessor count equal to zero and a highest priority-order, calculating a current end date based on all of the assignments that have been scheduled and the current assignment, scheduling each of the assignments not previously scheduled, which identify the current resource as the specific assigned resource, identify a parent task having a must-finish-by scheduling constraint that is earlier than the current end date, and identify a parent task with a predecessor count equal to zero, in the first available time-slot for the current resource, scheduling the current assignment in the first available time-slot for the current resource, and if all of the assignments identifying a common parent task have been scheduled, decrementing the predecessor counts for each of the plurality of tasks which have a dependency constraint identifying the common parent task as a predecessor task, and repeating step d2, and 3. if any of the assignments have not been scheduled, selecting a next resource from the plurality of resources as the current resource and repeating steps d2 and d3.

5. A computer system according to claim 4, wherein said processing unit is further operative for:

receiving a new set of resource constraints for a resource, the new set of resource constraints replacing an original set of resource constraints for the resource; and rescheduling each of the assignments in accordance with the set of resource constraints for its corresponding specific assigned resource and the task constraints for its corresponding parent task.

6. A computer system according to claim 4, wherein said processing unit is further operative for:

receiving a new set of task constraints for a task, the new set of task constraints replacing an original set of task constraints for the task; and rescheduling each of the assignments in accordance with the resource constraints for its corresponding specific assigned resource and the task constraints for its corresponding parent task.

7. A computer-readable medium having computer-executable instructions for performing a method for generating a schedule for a plurality of unscheduled assignments, each of the unscheduled assignments identifying at least one of a plurality of resources, a work-amount, a priority-order, one of a plurality of parent tasks, and a predecessor count indicating a number of predecessor tasks upon which the assignment depends, each of the resources having a resource calendar identifying available time-slots for the resource and each of the plurality of parent tasks having at least one scheduling constraint, the method comprising the steps of:

a. selecting a current resource from the plurality of resources;

b. selecting a current assignment from the plurality of unscheduled assignments, the current assignment identifying the current resource, identifying a parent task having a start-on scheduling constraint, and having a highest priority-order;

c. scheduling the current assignment in the first available time-slot of the resource calendar for the current resource;

d. identifying the current assignment as scheduled and repeating steps b–d if additional unscheduled assignments identifying the current resource are remaining;

e. if additional unscheduled assignments which identify a parent task having a start-on scheduling constraint exist, selecting a next current resource and repeating steps a-e with the next current resource; and f. scheduling each of the remaining unscheduled assignments by:
  1. selecting a next resource from the plurality of resources as the current resource,
  2. if at least one qualifying unscheduled assignment exists, the qualifying unscheduled assignments identifying the current resource, having a predecessor count equal to zero, and having a priority-order greater than any other unscheduled assignments which identify the current resource and have a predecessor count greater than zero:
    selecting a qualifying unscheduled assignment with a greatest priority-order as the current assignment,
    calculating a current end date based on all of the assignments that have been scheduled and the current assignment,
    if any unscheduled assignments exist which identify the current resource and identify a parent task having a must-finish-by scheduling constraint that is earlier than the current end date, scheduling each such assignment into the first available timeslot for the current resource, otherwise, scheduling the current assignment in the first available timeslot for the current resource,
    if all of the assignments identifying a common parent task have been scheduled, decrementing the predecessor counts for each of the plurality of assignments which have a dependency scheduling constraint identifying the common parent task as a predecessor task, and repeating step f2, and
  3. if additional unscheduled assignments exists, selecting a next resource from the plurality of resources as the current resource and repeating steps f2 and f3.

8. A computer-readable medium according to claim 7, wherein the method further comprises the steps of:
   receiving a new set of resource constraints for a resource, the new set of resource constraints replacing an original set of resource constraints for the resource; and
   rescheduling each of the assignments in accordance with the set of resource constraints for its corresponding specific assigned resource and the task constraints for its corresponding parent task.

9. A computer-readable medium according to claim 7, wherein the method further comprises the steps of:
   receiving a new set of task constraints for a task, the new set of task constraints replacing an original set of task constraints for the task; and
   rescheduling each of the assignments in accordance with the resource constraints for its corresponding specific assigned resource and the task constraints for its corresponding parent task.

* * * * *